May 23, 1967  P. D. COREY  3,321,694
CONTROL ARRANGEMENT FOR INVERSION SYSTEM
Filed Aug. 23, 1963
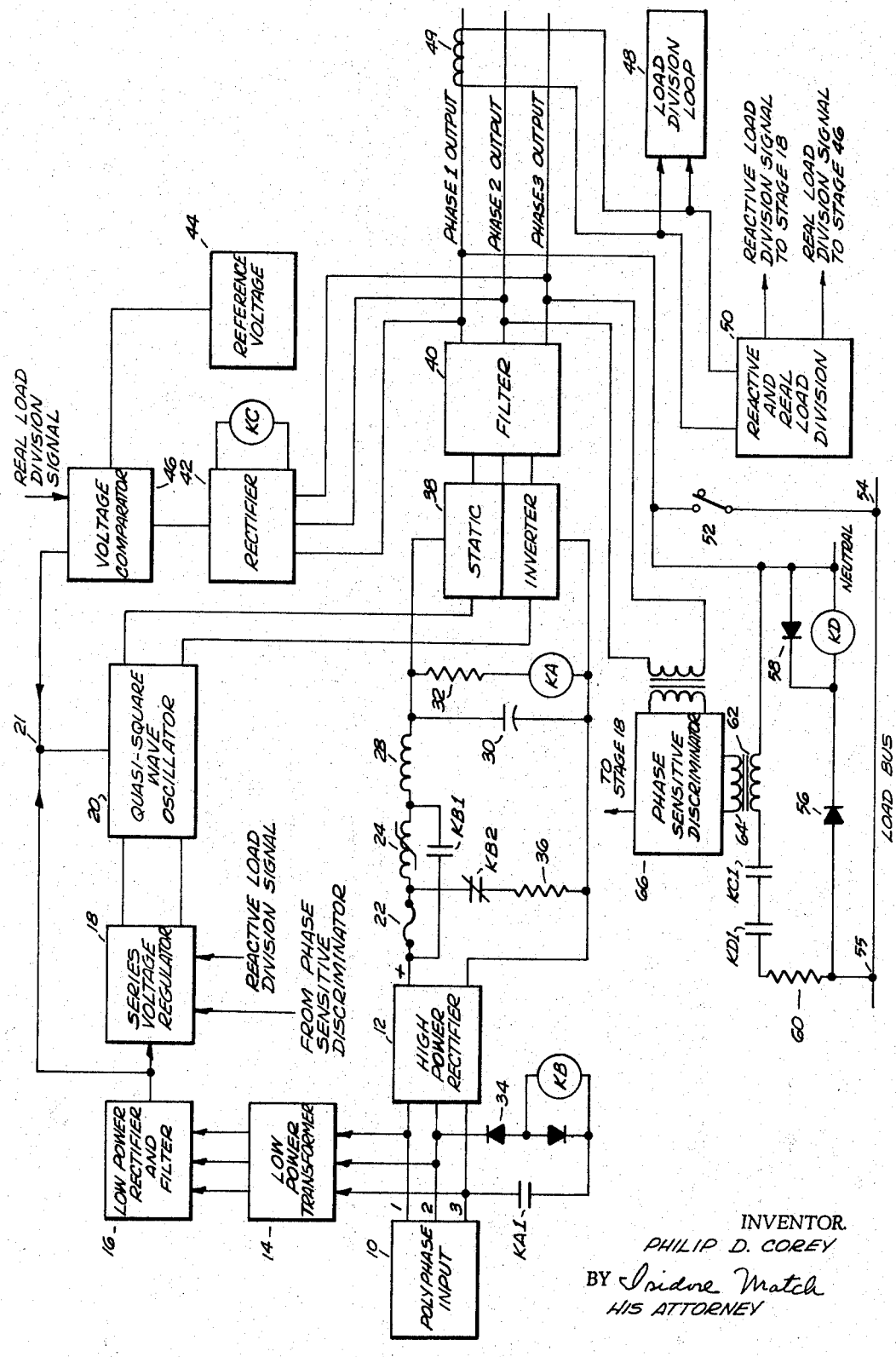
INVENTOR.
PHILIP D. COREY
BY Isidore Match
HIS ATTORNEY United States Patent Office 3,321,694
Patented May 23, 1967

3,321,694
CONTROL ARRANGEMENT FOR INVERSION SYSTEM
Philip D. Corey, Waynesboro, Va., assignor to General Electric Company, a corporation of New York
Filed Aug. 23, 1963, Ser. No. 304,145
9 Claims. (Cl. 321—18)

This invention relates to inverter systems. More particularly, it relates to an arrangement for insuring the reliable startup of such systems and for the presynchronization of such systems prior to their insertion into a complex of like paralleled systems.

In static inversion and frequency conversion systems wherein a unidirectional potential is converted to an alternating current potential of a given frequency, the problem which is often confronted is the lack of reliability of initiation of inverting action. Such unreliability may particularly be a factor where high power applications are involved and wherein the switching elements in the inverter of the system are gate controlled rectifiers. Furthermore, in the startup of such systems, there is invariably produced a startup transient which may lead to many deleterious effects such as the saturation of the output transformer, etc.

When an inverting system is paralleled with like systems in a multiple arrangement, means are included in the arrangement for maintaining voltage and frequency regultaion of the local system. However, quite ofter when the local system is initially paralleled into the multiple arrangement by a connection to the load bus common to the arrangement, if at that moment, the output of the system is not in synchronism with the voltage on the load bus, undesirable transients may occur on the load bus.

Accordingly, it is an important object of this invention to provide startup means for an inverting system which is simple and which substantially minimizes disturbances on the input line during startup transients.

It is another object to provide a presynchronization circuit for an inverting system when such system is paralleled with like systems in a multiple arrangement and to thereby minimize transients on the load bus common to the arrangement when the system is connected into the arrangement.

Generally speaking and in accordance with the invention, there is provided an inverter system comprising generating means having a chosen output frequency and inverting means for converting the output of a unidirectional potential source in accordance with the output of the generating means. Saturable means are included in circuit with the inverting means and adapted to be connected to the unidirectional potential source to delay the application of the unidirectional potential to the inverting means for the time required to saturate the saturable means. There is further included means responsive to the saturation of the saturable means and the consequent application of the unidirectional potential to the inverting means for removing the saturable means from circuit.

Also, in accordance with the invention, there is provided in an inverter system comprising generating means having a chosen output frequency and inverting means for converting the output of the unidirectional potential source to an alternating current output in accordance with the output of the generating means, the system being adapted to be connected in parallel into a multiple arrangement of like systems, the arrangement having a load bus common to all of the systems contained therein, a presynchronizing circuit for synchronizing the output of the inverting system with the voltage appearing on the load bus prior to the connection of the system into the parallel arrangement. The presynchronization circuit comprises means in circuit with the load bus and the local system output for comparing the local system output voltage and the load bus voltage on the load bus to derive a difference voltage therebetween. There are further included a source of reference voltage having a chosen phase relationship with the system output voltage and phase sensitive discriminating means for comparing the phase of the difference voltage with the phase of the reference voltage, the phase discriminating means producing an output when the system output voltage and the load bus voltage are not in phase. Means are provided for applying the output of the phase discriminating means to the generating means to vary the frequency thereof in accordance with the output of the phase discriminating means to synchronize the system output with the voltage appearing on the load bus. Upon the parallel connection of the system into the multiple arrangement, means responsive to this connection effects the disabling of the presynchronizing circuit.

The features of this invention which are believed to be new are set forth with particularity in the appended claims. The invention itself, however, may best be understood by reference to the following description when taken in conjunction with the accompanying drawing which shows an embodiment of a frequency converter according to the invention.

The drawing is a diagram of a system constructed according to the invention.

Referring now to the drawing, an alternating current voltage input 10 which may be single, or polyphase, such as a balanced three phase input, and having a frequency which it is desired to convert to a single or polyphase output such as a three phase output of a chosen frequency, is applied to a single or bridge rectifier generally designated by the numeral 12. The single or polyphase input may also be applied to a single or polyphase low power transformer 14 and the output or outputs of transformer stage 14 may be applied to a single or low power rectifier and filter stage 16 wherein the output or outputs of transformer 14 are rectified, combined and filtered. The output of stage 16 is a unidirectional potential that is utilized as the supply voltage for the oscillator 20 of the system which determines the output frequency.

The unidirectional potential output of stage 16 may be applied to a series voltage regulator 18 whereby at the output of stage 18, there is provided a voltage of a substantially constant amplitude. Voltage regulator stage 18 may suitably be an arrangement wherein a reference element such as a breakdown diode is utilized to provide a chosen voltage level and the regulated voltage from stage 18 is compared thereagainst. Any difference between the two voltages is fed back to active stages in regulator 18 to insure that the output voltage of the regulator substantially always matches the voltage across the breakdown diode.

This regulated voltage is applied as a supply voltage to a generating means such as oscillator 20 which suitably produces a quasi-square wave output having the aforesaid desired chosen frequency. A quasi-square wave oscillator may suitably be one in which like square waves having a phase displacement therebetween are generated and phasorially combined. Oscillator 20 may be of the magnetic coupled type, such oscillator having an output frequency which is directly dependent upon the magnitude of the supply voltage applied thereto.

The unidirectional output of high power rectifier stage 12 is applied through a fuse 22 and a saturable reactor 24 to a filter arrangement comprising a series connected inductor 28 and a parallel connected capacitor 30. A series arrangement of a resistor 32 and a relay KA is connected across capacitor 30. Connected between the phase 2 and phase 3 inputs of stage 10 is the series arrangement of the cathode to anode path of a diode 34, the operating coil of a relay KB and a pair of normally open contracts KA1 associated with relay KA. Of course, relay KB can be powered from any other convenient unidirectional potential when A.C. input 10 is of the single phase type, voltage source. Connected across the series arrangement of fuse 22 and saturable reactor 24 is a pair of normally open contacts KB1 and connected across the output of rectifier 12 is the series arrangement of a resistor 36 and a pair of normally closed contacts KB2 associated with relay KB.

Saturable reactor 24, relay KB which is the line contactor relay, inductor 28, capacitor 30, resistor 32 and relay KA comprise the circuit constructed in accordance with the principles of the invention which enables a reliable startup of the static inverter portion 38 of the system, especially if the inverter comprises silicon controlled rectifiers as the switching elements therein. This circuit minimizes the disturbance on the input line during the startup transient.

In the operation of the aforesaid startup circuit, when input power is initially applied, saturable reactor 24 which is in the unsaturated state, effectively prevents the output of high power rectifier 12 from being applied to static inverter 38 for the time that it takes reactor 24 to go to full saturation. Such time may suitably be chosen to be about 15 milliseconds. During these 15 milliseconds, oscillator 20 has commenced to operate and this saturation period presents an ample opportunity for the damping out of undesirable drive circuit transients in oscillator 20. Now, when reactor 24 saturates and its inherent unidirectional current winding resistance permits a slow RC charging of capacitor 30, power is gradually applied to static inverter 38. This gradual voltage rise permits the elimination of any possibility of the saturation of an output transformer (not shown) which is generally included in static inverter stage 38. It permits great attenuation of a startup surge as viewed from the input line.

At a given point in the charging cycle of capacitor 30, relay KA is energized with the consequent closing of normally open contacts KA1, this closing permitting the energization of the contactor relay KB with the resultant closing of normally open contacts KB1. Consequently, saturable reactor 24 is removed from circuit at this time. At the same time, normally closed contacts KB2 associated with relay KB assume the open position and resistor 36 is removed from circuit across the output of high power rectifier 12.

If the system should be shut down by the removal of the input, relay KB is deenergized whereby contacts KB1 and KB2 resume their normally open and normally closed positions respectively to place saturable reactor 24 and resistor 36 back into circuit. The connection of resistor 36 into circuit in this situation across rectifier 12, assures rapid discharge of capacitor 30.

In the event that there is a failure of startup which might be the result of a defective drive element such as a transistor in oscillator 20 or a defective switching element in static inverter 38 such as a power transistor or a power handling silicon controlled rectifier, relay KA is not energized and, consequently, contactor relay KB cannot be energized due to the remaining in their normally open position of contacts KA1. In this situation, fuse 22 interrupts the usually large current passing through the circuit path including saturable reactor 24. Thus a startup failure at most would result in the destruction of only one fuse and there would be produced only one relatively insignificant electrical transient. Saturable reactor 24 regains its unsaturated state by virtue of a suitable small airgap in its magnetic circuit path.

It is, of course, to be realized that relays KA and KB as well as the delay reactor 24 may be replaced by suitably rated other type elements such as semiconductors. Of course, the use of electromechanical switching devices as shown in the drawings present the advantages of economy and efficiency.

The filtered output of rectifier 12 is the unidirectional potential which is converted to an alternating current potential in accordance with the output of quasi-square wave oscillator 20, oscillator 20 providing the drive to inverter 38. Inverter 38 may suitably comprise a plurality of static inverters which may be combined to produce a single or a polyphase output such as a balanced three phase output. The switching elements in the static inverter may be transistors, silicon controlled rectifiers or the like.

The single or polyphase output of static inverter 38 may be filtered in a suitable low pass filter 40 to provide a single or balanced polyphase output of comparatively pure sinusoidal waves.

To regulate the output voltage, a portion of the output voltage may be rectified in a rectifier 42 and this rectified voltage may be compared in a voltage comparator 46 with the voltage from a reference voltage source 44, reference voltage source 44 representing a desired output voltage level. Any difference in voltage output from voltage comparator 46 is compared with the output of low power rectifier and filter stage 16 at point 21. The voltage supply for oscillator 20, the value of the reference voltage 44, the value of the circuit components in rectifier 42 and the value of the circuit components in voltage comparator 46 are so chosen that a difference voltage produced from voltage comparator 46 will have a polarity to increase the width of the pulses produced from oscillator 20 to increase the output voltage if it is below the desired value and have a polarity to decrease the width of the pulses produced by oscillator 20, if it is above the desired value. The operating coil of a relay KC is connected in circuit with rectifier 42 and its function will be further described hereinbelow.

If the system of the drawing is utilized in parallel with a plurality of like systems, then in accordance with known procedures it suitably includes means for coupling it to a load division loop for the system, means for effecting reactive load division by providing a reactive current unbalanced biasing signal for a frequency regulator and means for effecting real load division by providing a real load unbalanced biasing signal for a voltage regulator. In the arrangement as depicted in the drawing, the signal to the load division loop 48 and to stage 50 is provided by a current transformer in circuit with the phase 1 output. Stage 50 is shown as producing the real load and reactive load biasing signals, if the system is included in parallel arrangement of like systems. Since such load sharing circuits are well known in the art, further description of stage 50 is deemed unnecessary.

The reactive load biasing signal output of stage 50 is suitably applied to voltage regulator 18 in the oscillator channel. Actually, this is a frequency regulating signal since oscillator 20 is preferably chosen to be the type whose frequency is dependent upon the supply voltage applied thereto. The real load biasing signal output of stage 50 is suitably applied to voltage comparator means 46 in the output voltage regulating arrangement since such signal is required to provide voltage regulation of the output of the single system which is in parallel with other systems having the same output frequency. In the operation of the parallel system, normally the output of the single system is inserted into the parallel system by suitably closing a switch 52 which is provided between the load bus terminal 54 and the output of the system.

When the output of such single system is connected into the parallel arrangement such as by closing switch 52, there may occur objectionably large transients. To avoid such transients, in accordance with the principles of the invention, there is provided a pre-synchronization circuit to insure synchronization of the output of the system with the voltage appearing on the load bus of the parallel arrangement prior to the insertion of the system into the arrangement.

The pre-synchronization circuit includes the series arrangement of a forward poled rectifier 56 having its anode connected to load bus terminal 55 and the operating coil of relay KD, an inductance surge suppression diode 58 being connected across relay KD. In series arrangement with the output of a phase of the system such as the phase 1 output is the primary winding 62 of a transformer, normally open contacts KD1 associated with relay KD and the normally open contacts KC1 associated with relay KC in the voltage regulator circuit and a current limiting resistor 60.

In the operation of the pre-synchronization circuit, the energization of relays KC and KD causes the contacts KC1 and KD1 respectively associated therewith to assume the closed position whereby there is produced in primary winding 62 a difference voltage which results from the phasorial subtraction of the voltage appearing at the phase 1 output from the voltage sensed at load bus terminal 55. Such difference voltage may be due to an amplitude difference between in-phase voltages and may also be due to a difference in phase between the phase 1 output, for example, and the voltage sensed at load bus terminal 55.

The output produced in primary winding 62 appears in secondary winding 64 whereby it is applied as an input to a phase sensitive discriminator 66. Also applied to phase sensitive discriminator 66 is a reference voltage which is in phase quadrature with the voltage from phase 1. In this connection, in the event that the output of the system is a balanced three phase output, then the voltage from the phase 2 output to the phase 3 output is in quadrature with the phase 1 output to neutral voltage. Otherwise, a reference voltage source may be provided by other suitable means such as the passing of the phase 1 output through a 90° phase shifter and the like.

Phase sensitive discriminator 66 is chosen to be of the type which is sensitive to a quadrature phase difference in the inputs applied thereto and if the output across primary winding 62 is zero, or if it is an output which merely reflects an amplitude difference between the phase 1 voltage and the load bus voltage, then the output of phase sensitive discriminator 66 is zero. If there is a difference in phase between the phase 1 output and the voltage sensed at load bus terminal 55 whereby the voltage appearing in primary winding 62 reflects such phase difference, there is an output from phase sensitive discriminator 66. Such output is applied to voltage regulator 18 in the oscillator channel to regulate the frequency of oscillator 20 in accordance with such difference and thereby to synchronize the output of the system with the voltage sensed at load bus terminal 55. Once such pre-synchronization has been effected, switch 52 may be closed to connect the system output to the load bus, such closing shorting out the pre-synchronization circuit. Consequently, phase sensitive discriminator 66 is disabled and the reactive and real load division stage 50 is activated whereby real and reactive load sharing is maintaining during normal parallel operation.

When the pre-synchronization circuit is operating prior to the closing of switch 52, the output of phase sensitive discriminator 66 is in a polarity such as to influence the frequency of the output of oscillator 20 in a direction to synchronize the phase 1 output with the voltage sensed at load bus terminal 55.

While there has been described what is considered to be a preferred embodiment of this invention, it will be obvious to those skilled in the art that various changes and modifications may be made therein without departing from the invention and it is, therefore, aimed in the appended claims to cover all such changes and modifications as fall within the scope of the invention.

What is claimed as new and desired to be secured by Letters Patent of the United States is:

1. In an inverter system for converting the output of a unidirectional potential source to an AC output comprising generating means, inverting means responsive to said generating means for converting the output of said unidirectional potential source to said AC output in accordance with the output of said generating means; saturable magnetic means in circuit with said inverting means and adapted to be connected to said source to delay the application of said potential to said inverting means for the period required to saturate said saturable means, and means responsive to the application of said potential to provide an alternative connection of said inverting means to said potential source.

2. In an inverter system for converting the output of a unidirectional potential source to an AC output comprising generating means, inverting means responsive to said generating means for converting the output of said unidirectional potential source to said AC output in accordance with the output of said generating means; filter means for filtering the output of said unidirectional potential means, saturable magnetic means coupling said filter means to said source to delay the application of said potential to said filter means for the period required to saturate said saturable means, and means responsive to the application of said potential for establishing an alternative connection of said filter means to said source.

3. In an inverter system comprising generating means, having a given frequency output, and inverting means responsive to said generating means for converting the output of a unidirectional potential source to an A.C. output in accordance with the output of said generating means and means for applying a portion of said potential as a supply voltage to said generating means; filter means coupling said unidirectional potential source to said inverting means, saturable magnetic means coupled between said source and said filter means for delaying the application of said potential from said source to said filter means for the period required to saturate said saturable means and means responsive to said delay application of said potential for removing said saturable means from circuit and directly connecting said filter means to said source.

4. In an inverter system as defined in claim 3 wherein said filter means includes a series connected inductor and a parallel connected capacitor and wherein there is further included means connected across said source for providing a discharge path for said capacitor in response to the removal of said application of said potential.

5. In an inverting system as defined in claim 4 wherein said application responsive means comprises a first relay connected in parallel with said capacitor, an auxiliary potential source, a second relay and a pair of normally open contacts associated with said first relay connected in series arrangement with said auxiliary source, a pair of normally open contacts associated with said second relay connected across said saturable means, and wherein said discharge path means comprises the series arrangement of a pair of normally closed contacts associated with said second relay and a resistor connected across said source.

6. In an inverter system adapted to be connected in parallel into an arrangement of a plurality of inverter systems, said system including generating means having a frequency in accordance with a supply voltage applied thereto, inverting means for converting the output of a unidirectional potential source to an A.C. output in accordance with the output of said generating means, means adapted to be connected to said potential source for supplying a portion of said potential as said supply voltage to said generating means, said parallel arrangement having a load bus common to all of the systems included therein, and means for selectively connecting said system into said arrangement; a pre-synchronizing circuit comprising means responsive to the occurrence of an output from said system and an output on said load bus for comparing said outputs to provide a difference voltage therebetween, a reference voltage having a phase displacement from said system output of a chosen angle, phase sensitive discriminating means, means for applying said reference voltage and said difference voltage to said phase sensitive discriminating means to derive a voltage in accordance with the displacement in phase of the system output with respect to said load bus output, means for applying the output of said phase discriminating means as a correction signal to said generating means voltage supply to synchronize said system output with the voltage on said load bus, and means responsive to the connection of said system into said parallel arrangement for disabling said pre-synchronizing circuit.

7. In an inverter system as defined in claim 6 wherein said output occurrence responsive means comprises a first relay which is actuated in response to the presence of a system output voltage, a second relay which is actuated in response to the presence of a load bus voltage and the series arrangement of pairs of first and second normally open contacts associated with said first and second relays respectively, and wherein said comparing means comprises a first transformer having first primary and secondary windings, said system output being applied to one terminal of said primary winding, the load bus voltage being applied to the other terminal of said winding through said series arrangement.

8. In an inverter system as defined in claim 7 wherein said reference voltage is a voltage having the frequency of said system output and in quadrature therewith, and further including a second transformer having second primary and secondary windings, said reference voltage being developed across said second primary winding and wherein said means for applying said difference voltage and said reference voltage to said phase sensitive discriminating means comprises said first and second secondary windings.

9. In an inverter system adapted to be connected into a parallel arrangement of a pluraliy of like sysems and having a load bus common to all of said systems, said inverter system comprising generating means for producing an A.C. output having a frequency in accordance with a supply voltage applied thereto, inverting means in circuit with said generating means for converting the output of a unidirectional potential source to an A.C. output in accordance with the output of said generating means and means for applying a portion of said source as said supply voltage to said generating means, filter means comprising a series connected inductor and a parallel connected capacitor in circuit with said inverting means; saturable magnetic means in circuit with said filter means and adapted to be connected to said source to delay the application of the output of said source to said filter means for the period required to saturate said saturable means, a relay connected across said capacitor and energized in response to the saturation of said saturable means, an auxiliary potential source, a second relay connected in series arrangement with a pair of normally open contacts associated with said first relay and said auxiliary source and energized in response to the energization of said first relay, a pair of normally open contacts associated with said second relay connected across said saturable means, the series arrangement of a pair of normally closed contacts associated with said second relay and a resistor connected across said source, and a pre-synchronizing circuit comprising a third relay energized in response to the presence of a voltage on said load bus, a fourth relay energized in response to the presence of a system voltage output, means for comparing said system output and said load bus voltage comprising the series arrangement of a first transformer having first primary and secondary windings, and respective pairs of normally open contacts associated with said third and fourth relays, said system output being applied to one terminal of said first primary winding, said load bus voltage being applied to the other terminal of said first primary winding, a reference voltage source in phase quadrature with said system output, a second transformer having a primary winding across which there is developed said reference voltage and a secondary winding, phase sensitive discriminating means which produces an output in response to the application thereto of voltages in a phase relationship other than in quadrature, said reference voltage and said comparting means output being applied to said phase discriminating means through said secondary windings, means for applying the output of said phase sensitive discriminating means to said generating means voltage supply means, and means for selectively connecting said system output to said load bus, said pre-synchronizing circuit being disabled in response to said last-named connection.

References Cited by the Examiner
UNITED STATES PATENTS

| | | | |
|---|---|---|---|
| 3,161,837 | 12/1964 | Lloyd | 307—88.5 |
| 3,197,691 | 7/1965 | Gilbert | 321—25 |
| 3,205,424 | 9/1965 | Bates | 321—18 |
| 3,213,346 | 10/1965 | King Jr. | 321—14 |

JOHN F. COUCH, *Primary Examiner.*

M. L. WACHTELL, *Assistant Examiner.*